United States Patent
Huang et al.

(10) Patent No.: US 6,695,333 B2
(45) Date of Patent: Feb. 24, 2004

(54) CHAINLESS TRANSMISSION MECHANISM FOR BICYCLES

(75) Inventors: Yongqiang Huang, Guangzhou (CN); Jinhong Zhang, Guangzhou (CN); Yaocai Ou, Guangzhou (CN); Weihua Ruan, Guangzhou (CN); Shaofang Wu, Guangzhou (CN); Ronghua Xiao, Guangzhou (CN)

(73) Assignee: Guangzhou Motors Group Company (CN)

( * ) Notice: Subject to any disclaimer, the term of this patent is extended or adjusted under 35 U.S.C. 154(b) by 0 days.

(21) Appl. No.: 10/096,805

(22) Filed: Mar. 12, 2002

(65) Prior Publication Data

US 2002/0130483 A1 Sep. 19, 2002

(30) Foreign Application Priority Data

Mar. 15, 2001 (CN) ...................... 01 2 15618 U

(51) Int. Cl.[7] .............................. B62M 1/02; F16H 1/14
(52) U.S. Cl. ........................................ 280/260; 74/417
(58) Field of Search ................................ 280/259, 260, 280/262; 74/417

(56) References Cited

U.S. PATENT DOCUMENTS

| | | | | | |
|---|---|---|---|---|---|
| 5,299,819 A | * | 4/1994 | Leu | ............................. | 280/260 |
| 5,482,306 A | * | 1/1996 | Hsu | ............................. | 280/260 |
| 5,852,948 A | * | 12/1998 | Chang | ......................... | 74/417 |
| 5,967,537 A | * | 10/1999 | Chang | ......................... | 280/259 |
| 6,478,323 B2 | * | 11/2002 | Chang | ......................... | 280/260 |

* cited by examiner

Primary Examiner—Kevin Hurley
(74) Attorney, Agent, or Firm—John F. A. Earley; John F. A. Earley, III; Harding, Earley, Follmer & Frailey

(57) ABSTRACT

The invention is to provide a chainless transmission mechanism comprising a first shaft connected to a pedal of the bicycle; a first bevel gear connected to the first shaft; a second shaft perpendicular to the first shaft, two ends of which are connected to a second bevel gear and a third bevel gear, respectively, the second bevel gear being matched with the first bevel gear to drive the second shaft; a fourth bevel gear mounted on an axle of a rear-wheel hub of the bicycle to engage with the third bevel gear; a ratchet clutch connected between the rear-wheel hub and the axle; and a connection member connected between the fourth bevel gear and the rear-wheel hub. A bicycle with the chainless transmission mechanism of the invention is of a simple manufacturing process and a lower cost.

5 Claims, 3 Drawing Sheets

CHAINLESS TRANSMISSION MECHANISM FOR BICYCLES

FIELD OF THE INVENTION

The present invention relates to a bicycle, in particular, to a chainless transmission mechanism for a bicycle.

BACKGROUND OF THE INVENTION

A chainless bicycle comprises a drive mechanism mainly composed of bevel gears and transmission shafts to replace a chain in a conventional bicycle. The chainless bicycle has advantages of a stable transmission and a long life of use. However, the chainless bicycle in the prior art comprises a one-direction ratchet clutch. A spline hole of the bevel gear is matched with a spline shaft to complete the transmission. The chainless bicycle with such a structure is of a complicated manufacturing process and a high cost.

Therefore, it is needed to provide a chainless transmission mechanism for a bicycle to solve the problems in the prior art.

SUMMARY OF THE INVENTION

An object of the invention is to provide a chainless transmission mechanism for a bicycle to overcome the drawbacks in the art.

According to the invention, the chainless transmission mechanism comprises:

- a first shaft connected to a pedal of the bicycle;
- a first bevel gear connected to the first shaft;
- a second shaft perpendicular to the first shaft, two ends of which are connected to a second bevel gear and a third bevel gear, respectively, wherein the second bevel gear is matched with the first bevel gear to drive the second shaft;
- a fourth bevel gear mounted on an axle of a rear-wheel hub of the bicycle to engage with the third bevel gear;
- a ratchet clutch connected between the rear-wheel hub and the axle; and
- a connection member connected between the fourth bevel gear and the rear-wheel hub.

DETAILED DESCRIPTION OF THE INVENTION

The chainless transmission mechanism of the bicycle according to the present invention comprises a first shaft; a first bevel gear connected to the first shaft; second shaft vertical to the first shaft, two ends of which are connected to a second bevel gear and a third bevel gear, respectively, wherein the second bevel gear is matched with the first bevel gear to drive the second shaft; a third shaft vertical to the second shaft, connected to a clutch which is of ratchet and is connected to a fourth bevel gear matched with the third bevel gear; and a connection member for fixing the fourth bevel gear to the clutch.

In the transmission mechanism of the present invention, the connection member may comprise a hole at its end surface to match a first projection extended forwards from the back of the fourth bevel gear so that the clutch may be driven by the fourth bevel gear. The hole mentioned herein may be of a square, a hexagon and other shapes, and the first projection is of the same shape as the hole. The connection member is preferably connected to the clutch via a screw at the inner surface thereof.

At page 4, please amend numbered paragraph to read as follows:

The fourth bevel gear may comprise a second projection extended forwards from the first projection which may pass through the hole to be an inner ring of a bear of the clutch.

BEST MODE FOR CARRYING OUT THE INVENTION

The present invention will be described in detail in connection with the accompanying drawings.

Figure 1:
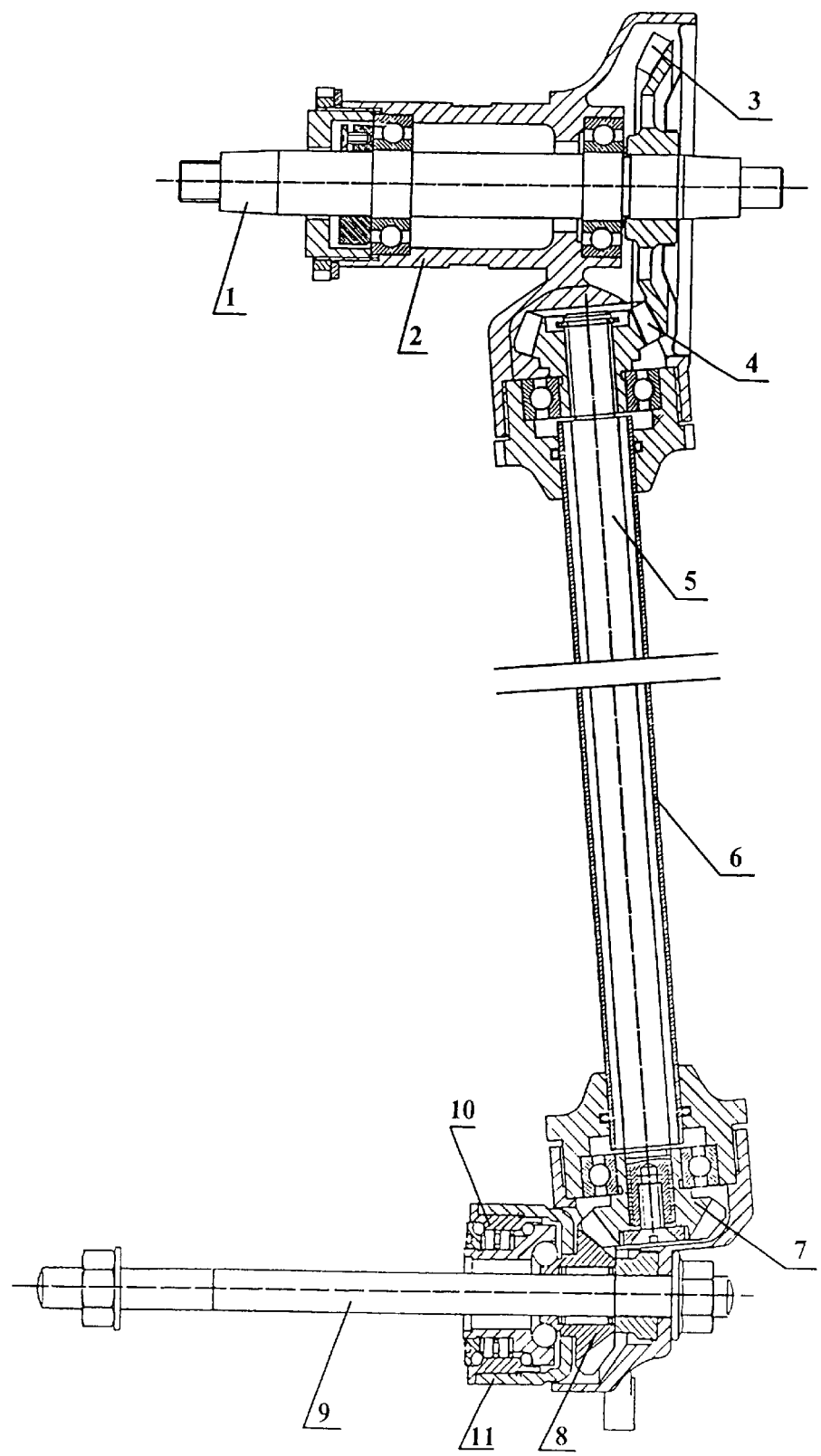
FIG. 1 is a view of one embodiment according to the invention.
Figure 2:
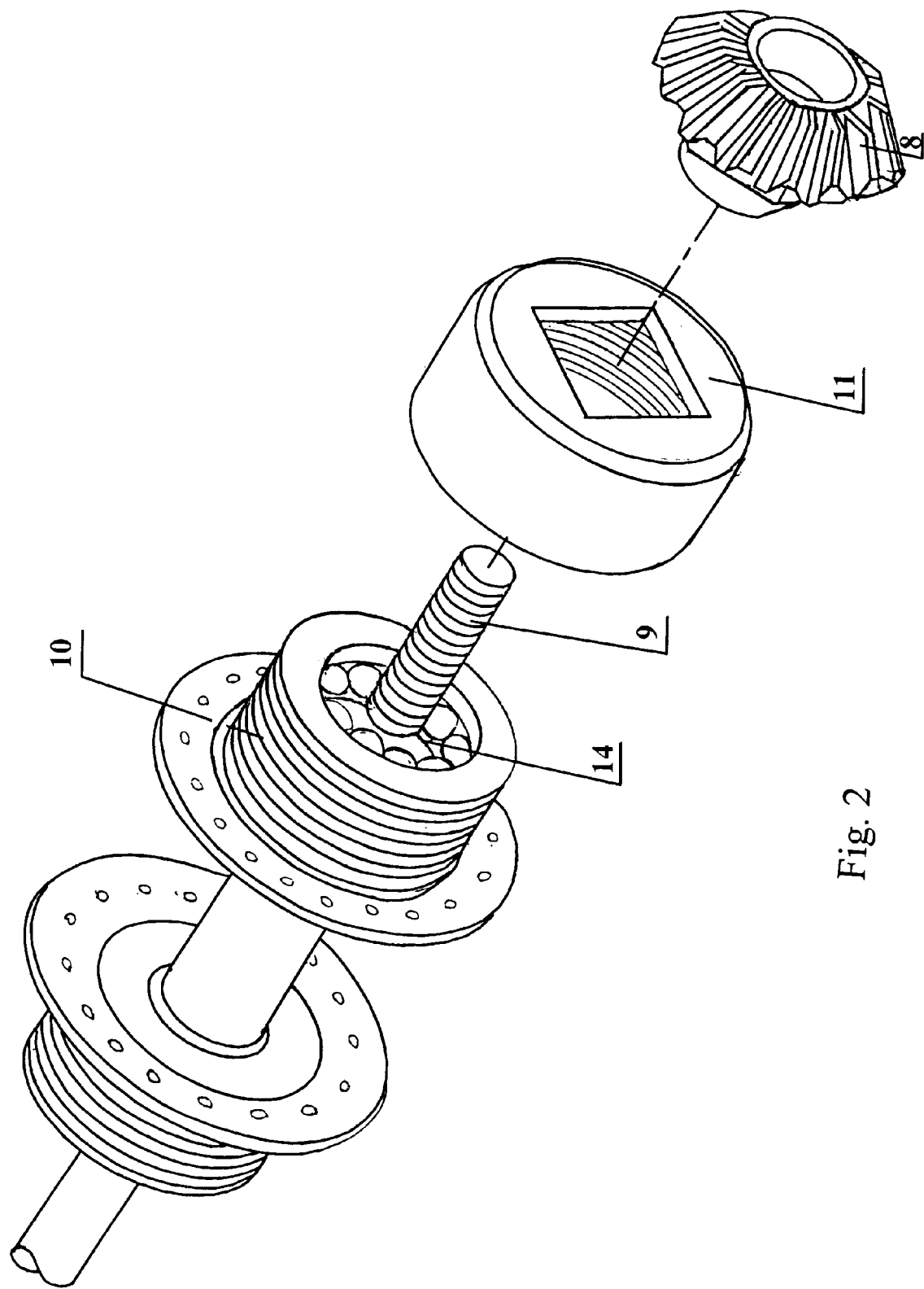
FIG. 2 is an assembly view of a connection member, a fourth bevel gear and a third shaft according to one embodiment of the invention.
Figure 3:
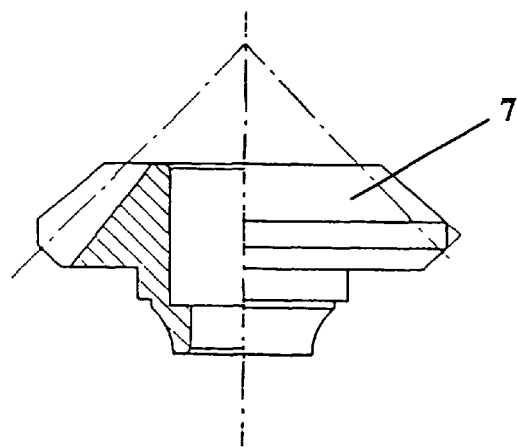
FIG. 3 is a sectional view of a third bevel gear according to the invention.
Figure 4:
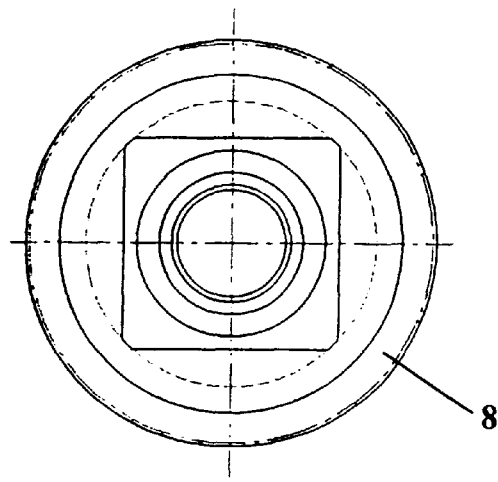
FIG. 4 is a cross sectional view of a fourth bevel gear according to the invention.
Figure 5:
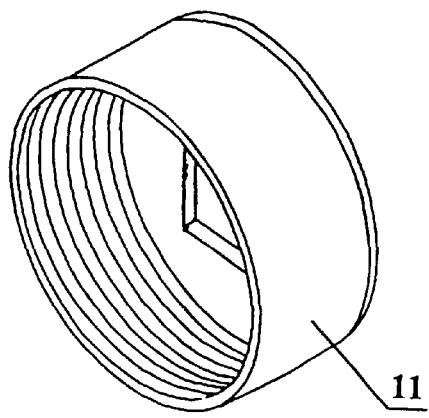
FIG. 5 is a view of a connection member according to one embodiment of the invention.
Figure 6:
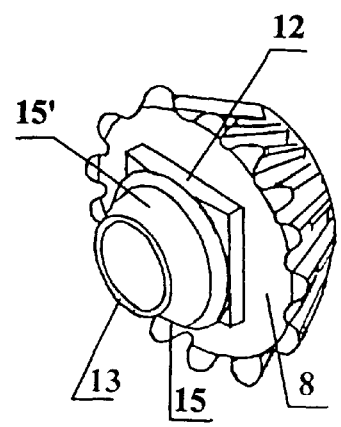
FIG. 6 is a view of a fourth bevel gear according to one embodiment of the invention.

Referring to FIG. 1, it shows one embodiment of the chainless drive mechanism according to the invention. The chainless drive mechanism comprises a first shaft 1, a first sheath 2 for housing the first shaft 1, connected to a frame of the bicycle, a first bevel gear 3, a second bevel gear 4, a second shaft 5, a second sheath 6 for housing the second shaft 5, a third bevel gear 7, a fourth bevel gear 8, a third shaft 9 connected to a rear-wheel of the bicycle, and a ratchet clutch 10. As shown in FIGS. 2 through 6, in this embodiment, a sleeve 11 as a connection member is connected to the outer surface of the clutch 10 through a screw thereon. The fourth bevel gear 8 comprising a hollow axle 13 is mounted on the third shaft 9. The hollow axle 13 includes a first projection 12 whose cross section is of a square, and a second projection 15, extended from the fourth bevel gear 8, successively. On the end surface of the sleeve 11 is a square hole which allows the second projection 15 to pass through and matches the first projection 12. Thus, the fourth bevel gear 8 is fastened to the ratchet clutch 10. The second projection 15 of the hollow axle is of a flute 15' that is used as an inner ring of a bearing 14 involved in ratchet clutch 10.

When the first shaft 1 is driven by the pedal to rotate, the first bevel gear 3 connected to the first shaft 1 is hereby rotated. The first bevel 1 drives the second bevel gear 4 to rotate. The second shaft 5 is driven by the second bevel 4. The rotation of the second shaft 5 gives rise to the rotation of the third bevel gear 7. The third bevel gear 7 hereby drives the third shaft 9 to rotate through the fourth bevel gear 8, which is housed on the third shaft 9 and matched with the third bevel gear 7. Thus, the rear wheel of the bicycle is driven to move forwards through the ratchet clutch 10. Since the ratchet clutch 10 is a one-direction clutch, the rear wheel of the bicycle will not move backwards if the first shaft 1 is driven by the pedal to rotate at an opposite direction.

Although this invention has been described above, variations and modification of the invention will be obvious to those skilled in the art from the foregoing detailed description of the invention. It is intended that all of these variations, modifications and equivalence thereof be included with the scope of the appended claims.

We claim:

1. A chainless transmission mechanism for a bicycle comprising a first shaft connected to a pedal of the bicycle;

a first bevel gear connected to said first shaft;

a second shaft directed perpendicularly to said first shaft, two ends of which are connected to a second bevel gear and a third bevel gear, respectively, wherein said second bevel gear is engaged with said first bevel gear to drive said second shaft;

a fourth bevel gear mounted on a third shaft of a rear-wheel hub of the bicycle to engage with said third bevel gear;

a ratchet clutch connected between said rear-wheel hub and said third shaft; and a connection member positioned between said fourth bevel gear and said ratchet clutch for connecting said fourth bevel gear and said ratchet clutch.

2. A chainless transmission mechanism for a bicycle comprising a first shaft connected to a pedal of the bicycle;

a first bevel gear connected to said first shaft;

a second shaft directed perpendicularly to said first shaft, two ends of which are connected to a second bevel gear and a third bevel gear, respectively, wherein said second bevel gear is engaged with said first bevel gear to drive said second shaft;

a fourth bevel gear mounted on a third shaft of a rear-wheel hub of the bicycle to engage with said third bevel gear;

a ratchet clutch connected between said rear-wheel hub and said third shaft; and a connection member connected between said fourth bevel gear and said ratchet clutch, wherein said connection member comprises a hole at its end surface to match a first projection extended forwards from the back of said fourth bevel gear so that said ratchet clutch may be driven by said fourth bevel gear.

3. The chainless transmission mechanism according to claim 2, wherein said fourth bevel gear comprises a second projection extended forwards from said first projection which may pass through said hole to be an inner ring of a bearing of said ratchet clutch.

4. The chainless transmission mechanism according to claim 2, wherein said connection member is connected to said ratchet clutch through a screw at the inner surface thereof.

5. The chainless transmission mechanism according to claim 2, wherein said hole is of a square and the cross section of said first projection is of the same shape as said hole.

* * * * *